(No Model.)
A. Y. CHAMBERLIN.
CHECK ROW WIRE REELING AND LAYING DEVICE.
No. 273,953. Patented Mar. 13, 1883.
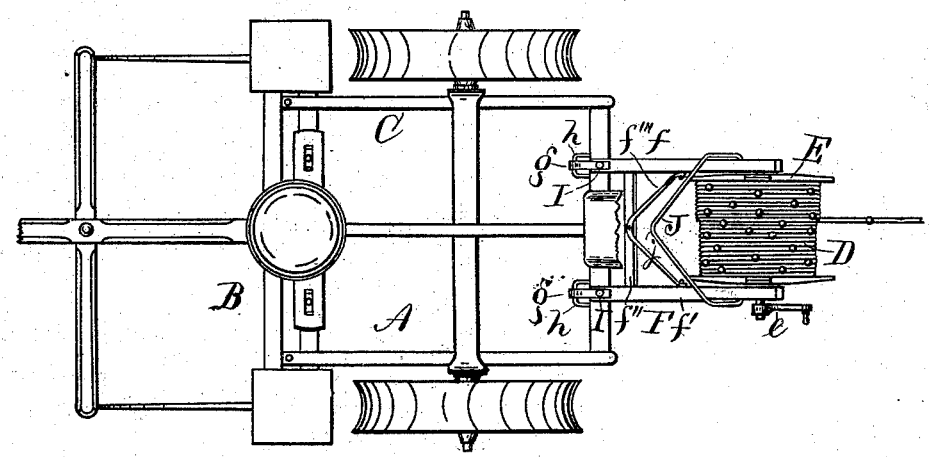
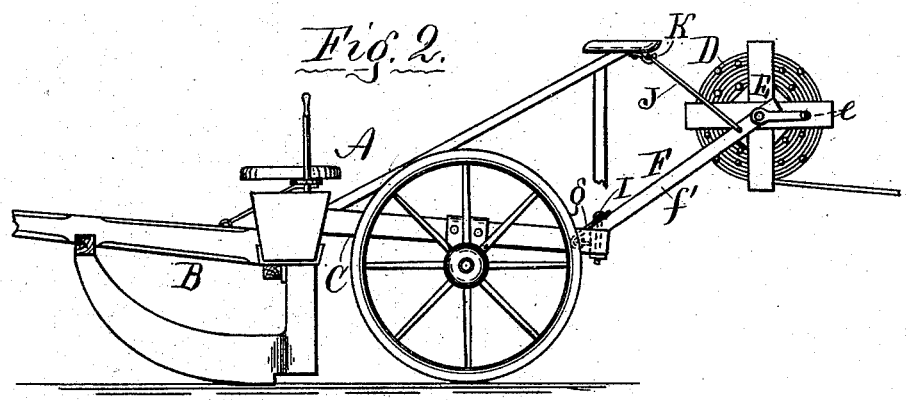
Witnesses:
S. R. Richards.
John Somers
Inventor:
A. Y. Chamberlin,
By W. B. Richards,
Atty.

UNITED STATES PATENT OFFICE.

AMZI Y. CHAMBERLIN, OF ALPHA, ILLINOIS.

CHECK-ROW-WIRE REELING AND LAYING DEVICE.

SPECIFICATION forming part of Letters Patent No. 273,953, dated March 13, 1883.

Application filed July 31, 1882. (No model.)

*To all whom it may concern:*

Be it known that I, AMZI Y. CHAMBERLIN, a citizen of the United States, residing at Alpha, in the county of Henry and State of Illinois, have invented certain new and useful Improvements in Corn-Planter Check-Row-Wire Reeling and Laying Devices; and I do hereby declare the following to be a full, clear, and exact description of the invention, such as will enable others skilled in the art to which it appertains to make and use the same.

In the accompanying drawings, which illustrate my invention, Figure 1 is a top plan of a construction showing my invention in place on a corn-planter. Fig. 2 is a side elevation of the device in position, as at Fig. 1, for laying the tappet-wire and for spooling it.

This invention relates to constructions and combinations hereinafter described, and set forth in the claims hereto annexed.

Referring to the drawings by letters, the same letter indicating the same part in the different figures, letter A represents the frame of a corn-planter, which may be formed of two frames, B and C, as shown, or may be of any other ordinary construction.

D is an ordinary tappet-wire, or wire with knots or tappets at regular intervals, adapted to actuate the seed-slides of the planter through the instrumentality of any ordinary check-row devices.

E is an ordinary reel, on which tappet-wires D are wound, as shown by full lines in the drawings.

F is a frame formed of side bars, $f\,f'$, connected by any suitable transverse bars, $f''$, and braces $f'''$. The axle of the reel E is journaled in the outer ends of the side frame-bars, $f\,f'$, with one end projecting for attachment of a crank, $e$. The frame-bars $f\,f'$ are provided at their lower ends each with a hook, $g$, which may be engaged respectively with staples $h$, which are attached to the rear frame-bar of the planter. A bolt, I, also passes through each frame-bar $f\,f'$, and through the rear frame-bar of the planter.

J is a bail, its ends pivoted in the bars $f\,f'$, respectively, and its central part, $j$, extended forward, so that it may be engaged with a hook, K, which is attached to the driver's seat, or to any suitable frame or part of the planter, and thus support the frame F with its rear end elevated and projecting in rear of the planter.

The frame F may be constructed differently from what I have described, and may be differently secured to the planter from what I have described, the essential feature of the invention relating more particularly to the matter of a reel-carrying frame mounted on the rear part of the planter, so as to support the reel entirely in rear of the planter in the most favorable position for laying the wire without interfering with the movements of the planter or coming in contact with any part thereof, or with the driver while laying the tappet-wire, as shown at Fig. 1, while the position of the frame is at the same time such that when desired—and the planter stationed at one side of the field—the tappet wire may be readily wound upon the reel by a person standing in rear of the planter, with no part of the planter in position to interfere with his movements or endanger his safety.

Any suitable brake may be applied to the reel to check its rotary motion and give proper tension to the wire as it is paid out in laying it.

What I claim as new, and desire to secure by Letters Patent, is—

1. In a corn-planter check-rower, in combination with the planter-frame, tappet-wire, and reel, a frame in one end of which frame the reel is journaled, and the other end of which is secured to the rear part of the planter, the reel and its carrying-frame being supported above the ground, with the reel in position entirely in rear of the planter for both laying or paying out and reeling the wire, substantially as and for the purpose specified.

2. In combination with a corn-planter machine, the reel and tappet-wire, and the reel-supporting frame, attached at its forward end to the planter-frame and supported at its rear end, whereby it is held in rear of the planter entirely above the ground and may be easily and readily removed therefrom, substantially as and for the purpose specified.

In testimony whereof I affix my signature in presence of two witnesses.

AMZI Y. CHAMBERLIN.

Witnesses:
 CYRUS F. TILDEN,
 G. W. STITT.